United States Patent
Akolekar et al.

(10) Patent No.: US 9,370,735 B2
(45) Date of Patent: Jun. 21, 2016

(54) IONIC LIQUID GRAFTED MESOPOROUS SILICA COMPOSITIONS FOR POLAR GAS/NON-POLAR GAS AND OLEFIN/PARAFFIN SEPARATIONS

(71) Applicant: Dow Global Technologies LLC, Midland, MI (US)

(72) Inventors: Deepak Akolekar, Pune (IN); Victor J. Sussman, Midland, MI (US); M J. Yanjarappa, Bangalore (IN); Phani Kiran Bollapragada, Pune (IN); Scott T. Matteucci, Midland, MI (US); Peter N. Nickias, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/426,867

(22) PCT Filed: Sep. 23, 2013

(86) PCT No.: PCT/US2013/061149
§ 371 (c)(1),
(2) Date: Mar. 9, 2015

(87) PCT Pub. No.: WO2014/055274
PCT Pub. Date: Apr. 10, 2014

(65) Prior Publication Data
US 2015/0231529 A1 Aug. 20, 2015

Related U.S. Application Data

(60) Provisional application No. 61/708,219, filed on Oct. 1, 2012.

(51) Int. Cl.
| | | |
|---|---|---|
| *B01D 53/22* | (2006.01) | |
| *B01D 61/38* | (2006.01) | |
| *B01J 20/283* | (2006.01) | |
| *B01J 20/286* | (2006.01) | |
| *B01D 19/00* | (2006.01) | |
| *C02F 1/44* | (2006.01) | |
| *B01J 20/16* | (2006.01) | |
| *B01J 20/10* | (2006.01) | |
| *B01J 20/32* | (2006.01) | |
| *B01D 71/02* | (2006.01) | |

(52) U.S. Cl.
CPC .......... *B01D 19/0031* (2013.01); *B01D 53/228* (2013.01); *B01D 61/38* (2013.01); *B01J 20/10* (2013.01); *B01J 20/16* (2013.01); *C02F 1/44* (2013.01); *B01D 71/028* (2013.01); *B01D 2323/36* (2013.01); *B01D 2325/18* (2013.01); *B01J 20/3242* (2013.01); *B01J 20/3285* (2013.01); *B01J 20/3287* (2013.01)

(58) Field of Classification Search
CPC .... B01D 71/02; B01D 71/024; B01D 71/025; B01D 71/027; B01D 71/028; B01D 2323/02; B01D 2323/46; B01D 2323/36; B01D 2325/18; B01D 61/38; B01D 53/228; B01J 20/10; B01J 20/103; B01J 20/16; B01J 20/165; B01J 20/32; B01J 20/3234; B01J 20/3242; B01J 20/3285; B01J 43/00
See application file for complete search history.

(56) References Cited

U.S. PATENT DOCUMENTS

| | | | |
|---|---|---|---|
| 7,943,543 B1 | 5/2011 | Liu et al. | |
| 8,449,652 B2 * | 5/2013 | Radosz et al. | 95/51 |
| 2010/0196971 A1 | 8/2010 | Lin et al. | |
| 2012/0190905 A1 | 7/2012 | Gorke et al. | |

FOREIGN PATENT DOCUMENTS

| | | |
|---|---|---|
| CN | 1609164 A | 4/2005 |
| CN | 101318949 A | 12/2008 |
| CN | 101724619 A | 6/2010 |
| CN | 101773852 A | 7/2010 |
| WO | 2011037820 A1 | 3/2011 |

OTHER PUBLICATIONS

Cai et al. A diol-functionalized ionic liquid: an efficient, simple, and recoverable "capture and release" reagent for aldehydes. Monatsh Chem (2009) 140:39-44.*
Dai, Wei-Li, et al., Catalysis Letters, 2010, vol. 135, No. 3-4, pp. 295-304.
International Preliminary Report on Patentability for PCT/US2013/061149, 2015, 1-17.
International Search Report and Written Opinion of the International Searching Authority for PCT/US2013/061149, Mail Date Jan. 3, 2014, pp. 1-16.
Kresge, C. T., et al., Nature, 1992, vol. 359, No. 6397, pp. 710-712.
Mishra, A.K., et al., Journal of Materials Chemistry, 2012, vol. 22, pp. 24366-24372.
Motos-Perez, B., et al., Applied Organometallic Chemistry, 2013, vol. 27, No. 5, pp. 290-299.
Valkenberg, M.H., et al., Green Chemistry, Royal Society of Chemistry, 2002, vol. 4, pp. 88-93.

* cited by examiner

*Primary Examiner* — Katherine Zalasky

(57) ABSTRACT

A composition comprising a mesoporous silica having grafted therewith an ionic liquid to form a mesoporous silica composition offers desirable levels of functionality, sorption, specific surface functionalization, and selectivity for polar gas/non-polar gas and olefin/paraffin separations. One particular embodiment employs silylated 3,3'-(2,2-bis(hydroxymethyl)propane-1,3-diyl)bis(1-methyl-1H-imidazol-3-ium)bis-((trifluoromethyl-sulfonyl)amide as the ionic liquid. The mesoporous silica composition may be configured as, for example, a membrane.

4 Claims, No Drawings

IONIC LIQUID GRAFTED MESOPOROUS SILICA COMPOSITIONS FOR POLAR GAS/NON-POLAR GAS AND OLEFIN/PARAFFIN SEPARATIONS

REFERENCE TO RELATED APPLICATIONS

The present application claims the benefit of U.S. Provisional Application No. 61/708,219, filed on Oct. 1, 2012.

BACKGROUND

1. Field of the Invention

The present invention relates to the field of mesoporous silica materials useful for separations. More particularly, it relates to a mesoporous silica having grafted therewith an ionic liquid that is particularly useful for certain separations.

2. Background of the Art

Mesoporous materials have been known to researchers for many years, and are used for a variety of applications. In general these materials are inorganic, solid materials characterized by a structure which comprises pores, the pores having average diameters in a general range of from 2 to 50 nanometers (nm). These pores may be uniform with constant diameters, or non-uniform with a variety of diameters. The porous structure provides for a large internal surface area with adsorptive capacity for molecular species which are capable of entering the pores. The pores may penetrate essentially the entire volume of the solid material, and therefore may be essentially two-dimensional or three-dimensional (i.e., channels), depending upon the configuration of the material's structure as a whole.

Mesoporous materials may be amorphous or crystalline. Examples of mesoporous materials include synthetic or natural crystalline pure silicates and aluminosilicates. Such may also be referred to as "framework aluminosilicates," where the framework is based on a three-dimensional network of $[(Al,Si)_4]$ tetrahedra which are linked to each other, at the corners, by shared oxygen atoms. Substitution of aluminum for silicon generates a charge imbalance, requiring the inclusion of an additional cation.

Mesoporous silicas have been shown to be able to successfully support ionic liquid catalysts including an acetate counterion, such as is shown in China Publication No. CN 101773852 (14 Jul. 2010). That publication describes functionalizing the surface of the mesoporous silica, followed by reaction with an imidazolium species. The catalyst thus prepared is used for preparing vinyl acetate in an acetylene method.

However, despite successful application of such mesoporous, or potentially mesoporous, silica materials in certain applications, some of these materials suffer from less than desirable performance with respect to dispersion in a given medium; resistance to diffusion; selectivity in separations operations; contact with adsorbates and/or reactants; and/or other difficulties in their use in specific industrial streams. In view of the above it is desirable to develop new silica-based mesoporous materials to reduce or eliminate one or more of these problems.

SUMMARY OF THE INVENTION

In one aspect the invention is a mesoporous silica composition comprising a mesoporous silica having grafted therewith an ionic liquid comprising silylated 3,3'-(2,2-bis(hydroxymethyl)propane-1,3-diyl)bis(1-methyl-1H-imidazol-3-ium)bis((trifluoromethyl)sulfonyl)-amide.

In another aspect the invention is a process for a separation comprising contacting: (1) a mesoporous silica, the mesoporous silica having grafted therewith an ionic liquid; and (2) a mixture, selected from a first mixture having as constituents a polar gas and a non-polar gas, and a second mixture having as constituents an olefin and a paraffin; under conditions such that, where the first mixture is selected, the polar gas and non-polar gas are substantially separated from one another, and where the second mixture is selected, the olefin and the paraffin are substantially separated from one another. In preferred embodiments the ionic liquid comprises silylated 3,3'-(2,2-bis(hydroxymethyl)propane-1,3-diyl)bis(1-methyl-1H-imidazol-3-ium)bis((trifluoromethyl)sulfonyl)-amide.

DETAILED DESCRIPTION OF THE EMBODIMENTS

One aspect of the invention is use, as a starting material, of a mesoporous silica, preferably one having a three-dimensional pore system. Such may be entirely silicate in composition, or may include an amount of tetrahedrally bound alumina, such that the mesoporous silica is technically an aluminosilicate. For purposes herein, such shall be collectively termed as "mesoporous silicas," regardless of inclusion of a small proportion of alumina, i.e., a Si:Al molar ratio of greater than 1000. Such may also, in alternative embodiments, be doped with even smaller amounts (less than 1 weight percent, wt %) of boron, phosphorus, or other metals. Examples of suitable materials within this description include, but are not limited to, synthetic mesoporous silicas such as those within the families of Type X, 3A, 4A, and 5; MCM-22 through MCM-41, and MCM-48; SBA-1, SBA-15, and SBA-16; and combinations thereof. The specifically exemplified zeolite grades listed hereinabove all have an average pore diameter generally considered as ranging from 0.3 nm to 0.8 nm and an overall average particle diameter generally considered as ranging from less than 0.5 micrometers (μm) to 16 μm, and in particular embodiments, from 2 μm to 16 μm. Such grades are preferred in certain particular embodiments. Where it is decided to employ MCM-22 through MCM-41, MCM-48, SBA-15, SBA-1, or SBA-16, in particular, in the present invention, such may advantageously be used as commercially supplied, as to both form and hydration state. While prior treatment or activation, e.g., to remove adsorbed water, is not generally necessary to the present invention, such may be carried out as part of the preparation of the inventive compositions or may have already been carried out as to commercially-obtained starting materials, if and where desired. Advantageously, the selected mesoporous silica (or silicas) is (are) used in powder (i.e., particulate) form.

Where suitable mesoporous silicas are not commercially available or commercially available materials are otherwise not selected for use in the present invention, such may be prepared from starting materials that include an organic structure-directing template and a silica source. Non-limiting examples of suitable structure-directing templates include cetyltrimethylammonium bromide (CTAB, also referred to as hexadecyltrimethylammonium bromide), hexadecyltrimethylammonium chloride, hexadecyltrimethylammonium hydroxide hydrate, hexadecyltrimethylammonium p-toluenesulfonate, hexadecyltrimethylammonium bis-sulfonate, and combinations thereof. A suitable silica source may be selected from, in non-limiting example, tetraethyl orthosilicate (TEOS), fumed silica, silica gel, silicon dioxide, LUDOX™ AM-30 colloidal silica (a suspended silica solution available from Sigma Aldrich), sodium silicate, polysilycic acid, other water soluble silicas and silicates, and combinations thereof.

In general the mesoporous silica may be prepared by contacting the structure-directing template and the silica source, preferably in solution, desirably but optionally in the presence of a promoter and under suitable conditions relating to time, temperature, and/or pressure. Such promoter may be, in one non-limiting embodiment, sodium nitrate ($NaNO_3$) or another alkali metal nitrate salt such as cesium nitrate ($CsNO_3$), and the molar ratio of the template to the silica source may desirably range in various embodiments from 0.1 to 10, and preferably from 0.1 to 2.0. Time may desirably range from 0.5 hours (h) to 200 h, and preferably from 10 h to 150 h; temperature may desirably range from 20 degrees Celsius (° C.) to 300° C., and preferably from 50° C. to 140° C.; and pressure may desirably range from 1 standard atmosphere (atm) (about 101.3 kilopascals, kPa) to 15 atm (about 1519.9 kPa), and preferably from 2 atm (about 202.7 kPa) to 5 atm (about 506.6 kPa). More preferably time may range from 10 h to 120 h; temperature from 50° C. to 140° C.; and pressure from 2 atm (about 202.7 kPa) to 5 atm (about 506.6 kPa). Stirring or other means of maximizing contact during the formation process is desirable. Following preparation of a suitable mesoporous silica, further purification steps, such as, for example, filtrations and washings and, especially, calcinations, with or without steam, at temperatures ranging from 300° C. to 700° C., preferably from 400° C. to 600° C., may be used to remove the organic template and/or any impurities and to obtain and/or to activate the desired mesoporous silica. As the term is used herein, the term "activate" means to increase the ultimate effectiveness of the prepared mesoporous silica.

It is a characterizing feature of the invention that the selected mesoporous silica has, grafted therewith, an ionic liquid, the graft product being herein termed the mesoporous silica composition. The terms "graft" and "grafted" as used herein refer to the presence of a covalent bond between the mesoporous silica and the ionic liquid. The ionic liquid serves to modify the properties of the mesoporous silica relating to, for example, efficiency and selectivity in applications such as separations, and in particularly desirable embodiments, in separations of polar gas/non-polar gas and olefin/paraffin mixtures. Performance for these as well as for other operations will ultimately depend upon the chemical and physical properties of the mesoporous silica and of the ionic liquid, as well as the conditions under which the grafting of the ionic liquid and the mesoporous silica is carried out. However, in general the ionic liquid serves to impart functionalities, to the process or system where the mesoporous silica composition will be used, that are over and above those imparted by or attributed to the mesoporous silica alone. In other words, the increase in number and/or alteration in type of chemical groups available for catalytic activity during the separation can enhance the transport mechanism that is attributable first to the size- and shape-selectivity of the mesoporous silica alone.

In one preferred embodiment, the selected ionic liquid has an imidazolium cationic functionality. In another embodiment, the selected ionic liquid is a multiple resonance (i.e., weakly coordinating) salt including an anion such as, in non-limiting example, tetrafluoroborate ($BF_4^-$), hexafluorophosphate ($PF_6^-$), dicyanamide (dca$^-$), sulfonate ($RSO_3^-$, where R is an aliphatic or aromatic hydrocarbon such as methyl, ethyl, propyl, phenyl, tolyl, etc.), triflate (OTf$^-$), bis(trifluoro-methanesulfonimide) ($Tf_2^-$), or the like. An advantage of these weakly coordinating materials is that they are generally molten at room temperature when combined with a delocalized cation such as imidazolium, which allows for improved separation of, for example, $CO_2$ from other gases. One particularly useful imidazolium cation-containing ionic liquid is silylated 3,3'-(2,2-bis(hydroxymethyl)propane-1,3-diyl)bis(1-methyl-1H-imidazol-3-ium)bis((trifluoromethyl)sulfonyl)-amide), which may be shown as having the empirical formula designated as Formula 1:

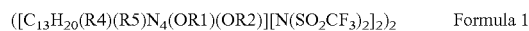

$([C_{13}H_{20}(R4)(R5)N_4(OR1)(OR2)][N(SO_2CF_3)_2]_2)_2$    Formula 1 wherein R1 is H or Si(OR3)$_3$; R2 is H or Si(OR3)$_3$; R3 is —(CH$_2$)$_n$CH$_3$ or C$_6$H$_6$; R4 is H, —(CH$_2$)$_n$CH$_3$ or C$_6$H$_6$; R5 is H, —(CH$_2$)$_n$CH$_3$ or C$_6$H$_6$; and N is 0-20. The structure of this material may alternatively be illustrated by Formula 2 hereinbelow.

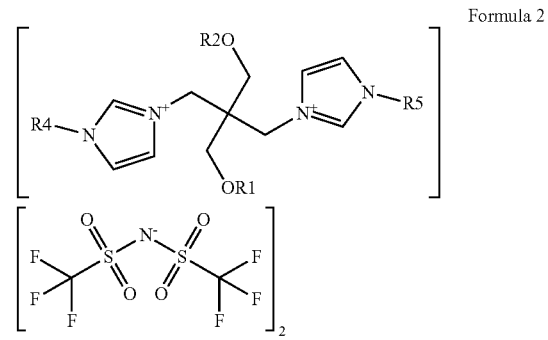

Formula 2

It is notable that the imidazolium functionality may contribute to thermal stability and that this silylated molecule, as a whole, may enhance the sorption capability and selectivity of the grafted product. Additional or alternative functionality, as imparted by an ionic liquid, that may be desirable in other embodiments include, in non-limiting example, methyl, amino or amine. In particular, the Formula 1 material may contain a hydroxyl functional group (OR1, where R1 is H; or OR2, where R2 is H), the presence of which may facilitate silylation of the compound which, in turn, may facilitate grafting of the ionic liquid onto the surface of the mesoporous silica. Silylation can be carried out by a method such as, in non-limiting example, reflux of the selected ionic liquid in the presence of a suitable silane material, for example, trimethylsilylchloride or bis(trimethylsilyl) trifluoroacetamide.

In general, preparation of the final mesoporous silica-supported ionic liquids having three-dimensional pores of the invention may be by any effective means. See, for example, Kresge, C. T.; Leonowicz, M. E.; Roth, W. J.; Vartuli, J. C.; Beck, J. S.; *Nature*, 359, 710, (1992). For example, in one non-limiting embodiment, the selected mesoporous silica and selected ionic liquid may be desirably contacted with stirring and refluxed at suitable increased temperature for a period of time. This will help to ensure grafting of the ionic liquid to the mesoporous silica. For example, in certain non-limiting embodiments stirring, with or without refluxing, may be carried out under conditions wherein the molar ratio of ionic liquid to silica ranges from stoichiometric to greater than stoichiometric, for example, from a 5- to 10-fold excess of the ionic liquid. Temperature may conveniently range from 0° C. to 240° C., desirably from 20° C. to 100° C., more desirably from 50° C. to 100° C., and in certain particular embodiments, from 50° C. to 60° C., while time may conveniently range from 0.5 h to 40 h, desirably from 0.5 h to 24 h, and most preferably from 10 h to 24 h. Alterations of pressure may be used in order to alter reaction time, with such pressures preferably ranging from 1 atm (about 101.3 kPa) to 500 atm (about 50662.5 kPa). In particular, use of higher pressures may conveniently reduce reaction time. Other methods may alternatively be employed, provided that the end result is that the ionic liquid ultimately achieves a desired level of grafting to the selected mesoporous silica. In particular but non-limiting embodiments, that level may desirably range from 1 weight percent (wt %) to 100 wt %, preferably from 5 wt % to 90 wt %, and more preferably from 5 wt % to 55 wt %, based on weight of the silica.

Confirmation that a given ionic liquid has, indeed, been grafted with a given mesoporous silica may be obtained by means and methodology conventionally used in the art to determine the presence of a covalent bond or bonds. For example, X-ray diffraction (XRD), solid state nuclear magnetic resonance (NMR) imagine, Fourier Transform infrared spectroscopy (FT-IR), and thermogravimetric analysis (TGA) in nitrogen, and simple washings in organics to determine weight loss may be useful in this endeavor.

Once the ionic liquid has been bonded to the mesoporous silica to form the mesoporous silica composition, it may be desirable in certain embodiments to further modify the functionality of the product by impregnating it with a pi-bond phillic salt, such as is disclosed in, for example WO 2011037820. Such a salt may include cations such as, in non-limiting embodiments, silver ($Ag^+$), copper ($Cu^+$). Other pi-bond phillic metals, such as palladium) ($Pd^0$) or platinum ($P^0$), may alternatively be selected. This further modification may be accomplished by subsequent contact of the mesoporous silica composition with, for example, a silver and/or copper salt solution, with the silver and/or copper salt solution being preferably in a concentration in aqueous solution of up to about 20 wt %. This procedure results in ion exchange of the salt in the ionic liquid and represents a method that is well known to those skilled in the art. See also, for example, WO 2011037820. Impregnation using one or more of these salts may serve to enhance the selectivity of the ionic liquid grafted mesoporous silica to pi-bond containing gases, such as olefins, in separations thereof from gases that lack pi-bonds, such as paraffins, while at the same time reducing the loss in selectivity over time which is caused by the transport of the pi-bond phillic salt to the permeate side of a membrane. This progressive loss of selectivity is attributable to the relative immobility of the salt-carrying phase, i.e., of the ionic liquid.

The ionic liquid grafted mesoporous silica materials, i.e., the mesoporous silica compositions, may be used in a variety of applications. For example, separations, such as polar gas/non-polar gas separations and olefin/paraffin separations (e.g., $CO_2$/alkanes, ethylene/ethane, etc.), can be carried out effectively due to the fact that the mesoporous silica support material is a solid and therefore suitable for use in, for example, fixed beds. In applications such as these, where in general a mixture of either a polar gas and a non-polar gas, and/or of an olefin and a paraffin, are to be separated from one another, it is desirable that conditions be suitable to ensure that such respective separation is accomplished to a substantial level. As the terms are used herein, "substantial" and "substantially" mean that such separation is completed to a level of at least 90 weight percent (wt %), based on total mixture, i.e., at least about 90 wt % of each of the main constituents in the defined two-constituent pairs (polar gas/non-polar gas or olefin/paraffin) is successfully isolated from the other. More desirably, that level is at least 95 wt %, and most desirably at least 99 wt %. Pressure swing adsorptions can also be effectively accomplished. In still other embodiments the inventive materials may alternatively be fabricated into membranes and used in electronic devices for thermal and/or conductivity management and for a variety of transport-related applications including, but not limited to, gas separations, drug and fragrance release applications, gas detection, heavy metal removal, water purification, and combinations thereof.

EXAMPLES

Example 1

Comparative

Synthesis of Mesoporous Silica 10 milliliters (mL) of TEOS is mixed with 50 mL of deionized water and the mixture vigorously (add rpm) stirred for 60 minutes (min) at 308 degrees Kelvin (K, about 35° C.) Then, 0.9024 grams (g) of sodium hydroxide (NaOH) is added to the mixture, followed by 0.3835 g of sodium nitrate ($NaNO_3$) as a promoter. After an additional 60 min of vigorous stirring at 308 K (about 35° C.), 10.69 g of cetyltrimethylammonium bromide (CTAB, alternatively referred to as hexadecyltrimethylammonium bromide) is added to the mixture and continued stirring at 368 K (about 95° C.) for 60 min. Finally the mixture is heated in an autoclave under static conditions at 398 K (about 125° C.) for 24 hours (h). The resulting product is filtered, washed with distilled water and dried at 373 K (about 100° C.). The organic template is removed by calcination at 823 K with a heating rate of 5 K/minute (min, 5° C./min) The X-ray diffraction (XRD) patterns of the as-synthesized and calcined material show the MCM-48 type structure.

Synthesis of Dihydroxy Ionic Liquid Monomer

A 100 mL single necked round bottom flask with side arm is equipped with a stir bar and flame dried using a heat gun followed by cooling under vacuum. After releasing the vacuum with argon, the flask is charged with 5 g of 1-methylimidazole (60 mmol), 5 g of 2,2-bis(bromomethyl)-1,3-propane diol (20 mmol) and 10 mL of dimethylformamide (DMF) solvent. The contents are flushed with nitrogen for from 30 to 40 min followed by heating the contents to 323 K (about 50° C.) for a period ranging from 15 to 16 h. A solid imidazolium bromide salt is found to precipitate slowly from DMF solution as the reaction progresses. At the end the flask is cooled to room temperature and the white solid product is separated from the solvent by filtration. The solids are further washed with 30 mL of anhydrous dichloromethane (DCM) four times. Removal of solvent traces via rota-vapor results in approximately 7 g of imidazolium bromide salt (84% yield). Subsequent bromide exchange is achieved by mixing the aqueous solution of imidazolium bromide (15 mL) with 14 g of lithium bis(trifluoromethane)sulfonimide (48 millimoles, mmol). A water insoluble, viscous clear liquid is found to at the bottom of the flask immediately after addition of lithium salt. The mixture is further stirred for another 2 to 3 h at room temperature for complete exchange. Finally, the product is separated from the aqueous phase and dried under high vacuum to give approximately 12 g of ionic liquid (70% yield).

Silylation of Ionic Liquid Monomers

A 100 mL single necked round bottom flask with side arm is equipped with a stir bar and flame dried using a heat gun followed by cooling under vacuum. After releasing the vacuum with argon, the flask is charged with 2 g (2.4 mmol) of ionic liquid and dried under vacuum to remove any traces of dissolved water. The flask is transferred to a glove box and dissolved in approximately 5 mL of dry acetonitrile followed by addition of 1 g of bis(trimethylsilyl) trifluoroacetamide silylating agent (3.8 mmol). The flask is taken out of the glove box and the contents refluxed at 223 to 228 K (about −50° C. to about −45° C.) for 5 to 6 h. At the end the solvent and excess silylating agent are removed via rota-vapor to give approximately 2.6 g of silylated ionic liquid. The silylated ionic liquid is characterized by LC-Mass spectroscopy analysis (Thermo Make Focus GC DSQ II MS), and $^1$H-NMR (300 MHz Varian, using dimethyl sulfoxide-d6 (DMSO-d6) as a solvent). Product is termed silylated ionic liquid.

Grafting/Modification of Calcined Mesoporous Silica Using Silylated Ionic Liquid The silylated ionic liquid described hereinabove is grafted onto the surfaces of MCM-48 by refluxing 0.25 g of calcined MCM-48 with 15 mL of chloroform (dry, 99.8% purity, from Aldrich) and 0.72 g of the silylated ionic liquid. The mixture is stirred and refluxed at 334 K (about 61° C.) for 24 h. The ionic liquid functionalized MCM-48 is then washed repeatedly with chloroform (ethanol may alternatively be used) and dried at 353 K (about 80° C.) for 8 h. The ionic liquid grafted silica is characterized by using X-ray diffraction (XRD), Brunauer-Emmett-Teller (BET) surface area measurements, scanning electron microscopy (SEM), Fourier Transform infrared spectroscopy (FT-IR), and thermogravimetric analysis (TGA) in nitrogen. XRD patterns of all samples are recorded on a PANanalytical, X'pert PRO X-ray diffractometer using copper (Cu) radiation source. $N_2$ isotherms are carried out by using Micromeritics ASAP 2010. The morphology and crystallite particle sizes are determined using the Leica 440 SEM. FTIR spectra are collected using ThermoFisher (ICC) (DRIFTS-cup experiments). TGA determination carried out using TA instruments model QA500. Table 1 lists various loadings of silylated ionic liquids onto mesoporous supports, and Table 2 gives the change in surface areas and pore volumes of the mesoporous supports after grafting of the silylated ionic liquids.

TABLE 2

Comparison of surface areas and pore volumes with and without grafting of silylated ionic liquids onto mesoporous silica supports.

| Sample No. | BET surface area ($m^2/g$) | Total pore volume ($cm^3/g$) | Pore diameter (angstrom, Å) BJH* adsorption average pore diameter |
| --- | --- | --- | --- |
| 1 | 858 | 0.44 | 23.9 |
| 2 | 915 | 0.45 | 23.7 |
| 3 | 5.1 | 0.01 | 0.01 |
| 4 | 65 | 0.05 | <16 |
| 5 | 743 | 0.40 | <18 |
| 6 | 227 | 0.15 | <19 |
| 7** | 1302 | 0.68 | 25.2 |

*BJH: Barret-Joyner-Halenda method, which calculates mesopore distribution from nitrogen adsorption data
**Sample 7 is a comparative and does not include an ionic liquid graft.

Example 2

Adsorption of $CO_2$

Sorption measurement of carbon dioxide on the ionic liquid grafted mesoporous composition of Example 1 is carried out using BET measurements taken from a pressure of from 19 to 760 millimeters of mercury (mm Hg, torr) at 297 K (about 24° C.). It shows carbon dioxide sorption capacity of 25 mL/g at 297 K (about 24° C.) and 760 mm Hg. The observed BET surface area using carbon dioxide is 45 $m^2/g$ with pore size of 40 angstroms (Å). The carbon dioxide isotherm shows weak to medium interaction of carbon dioxide with the grafted mesoporous silica composition, which is beneficial in the case of use of the inventive materials in membrane separation processes.

Example 3

Separation of Ethylene and Ethane

A 50/50 wt % mixture of ethylene and ethane is process over a fixed bed packed with the mesoporous silica composition of Example 1 in order to separate the olefin (ethylene) from the paraffin (ethane).

TABLE 1

Grafting of mesoporous silicas with ionic liquids

| Sample No | Quantity of mesoporous support used (g) | Amount of ionic liquid used | Grafting agent loading (wt %) | Grafting solvent and volume (mL) | Stirring speed (rpm) | Reaction temp (K/° C.) | Reaction time (h) |
| --- | --- | --- | --- | --- | --- | --- | --- |
| 1 | 0.25 | 0.72 | 11 | Chloroform (15) | 320 | 334/61 | 24 |
| 2 | 0.22 | 0.72 | 9 | Chloroform (15) | 320 | 334/61 | 24 |
| 3 | 1.50 | 0.72 | 51 | Chloroform (70) | 320 | 332/59 | 40 |
| 4 | 1.35 | 0.72 | 36 | Chloroform (70) | 350 | 327/54 (16 h) and 333/60 (5 h) | 21 |
| 5 | 1.47 | 0.52 | 25 | Chloroform (67) | 350 | 332/59 | 18 |
| 6 | 2.5 | 0.935 | 33 | Chloroform (80) | 350 | 332/59 | 18 |

What is claimed is:

1. A process for a separation comprising contacting: (1) a silicate composition, comprising a mesoporous silica or mesoporous aluminosilicate having grafted therewith an ionic liquid comprising silylated 3,3'-(2,2-bis(hydroxymethyl)propane-1,3-diyl)bis(1-methyl-1H-imidazol-3-ium) bis((trifluoro-methyl)sulfonyl)-amide; and (2) a mixture having at least two constituents the mixture selected from a first mixture having as constituents a polar gas and a non-polar gas and a second mixture having as constituents an olefin and a paraffin; under conditions such that the at least two constituents are substantially separated from one another.

2. The process of claim 1, wherein the ionic liquid further comprises a salt selected from a silver salt including $Ag^+$, a copper salt including $Cu^+$, and a combination thereof.

3. The process of claim 1, wherein the mesoporous silica composition forms a membrane.

4. The process of claim 1, being used in an application selected from gas separations, electronic devices, drug and fragrance release, gas detection, heavy metal removal, water purification, and combinations thereof.

* * * * *